United States Patent [19]
Zusman

[11] Patent Number: 5,869,409
[45] Date of Patent: Feb. 9, 1999

[54] GEL-FIBERGLASS AND A METHOD FOR ITS PREPARATION

[76] Inventor: Rivka Zusman, Gilo 426/7, Jerusalem, Israel, 93905

[21] Appl. No.: 112,087

[22] Filed: Aug. 26, 1993

[30] Foreign Application Priority Data

Aug. 26, 1992 [IL] Israel ......................................... 102948

[51] Int. Cl.$^6$ ....................................................... B32B 7/00
[52] U.S. Cl. ........................ 442/180; 427/387; 427/389.8; 428/429; 428/447
[58] Field of Search ..................................... 428/429, 447, 428/285, 290; 427/387, 389.8; 442/180

[56] References Cited

PUBLICATIONS

"Sol–Gel Science: The Physics and Chemistry of Sol–Gel Processing", Brinker et al., 1990, pp. 453, 839, 868–869.
"Doped Sol–Gel Glasses as Chemical Sensors", Rivka Zusman et al., Journal of Non–Crystalline Solids 122 (1990), pp. 107–109.
"Biochemically Active Sol–Gel Glasses: The Trapping of Enzymes", vol. 10, No. 1,2, Sep. 1990, pp. 1–5.
"Purification of Sheep Immunoglobin G Using Protein a Trapped in Sol–Gel Glass", Rivka Zusman et al., Analytical Biochemistry 201, pp. 103–106 (1992).

*Primary Examiner*—James J. Bell
*Attorney, Agent, or Firm*—Lowe Hauptman Gopstein & Berner

[57] ABSTRACT

A gel-fiber glass (GFG) is a newly-formed sol-gel glass polymerized from tetramethoxysilane on the surface of activated glass wool fibers or activated fibrous glass. GFG is a support for trapped chemical or biochemical reagents. A thin layer of reagents trapped in gel glass during its preparation is present on the surface of a lattice of glass fibers. Columns for affinity chromatography were prepared from the GFG membranes with entrapped antigens or antibodies and were used to isolate different proteins, including tumor-associated antigens; GFG membrane demonstrated high effectiveness and stability, and can isolate proteins in extremely high amounts. The membranes can be used in diagnostic practice, generation of specific antibodies and therapy.

13 Claims, 5 Drawing Sheets

GEL-FIBERGLASS AND A METHOD FOR ITS PREPARATION

FIELD OF THE INVENTION

The present invention relates to a gel-fiberglass characterized by newly formed sol-gel glass polymerized from tetramethoxysilane on the surface of said glass. Said gel-fiberglass can serve in an enormous number of applications, for example as a support for chemical or biochemical reagents trapped in said newly formed sol-gel glass. The present invention also relates to the preparation of said fiberglass with or without trapped material in the sol-gel glass.

Said invention also relates to a method for obtaining an interaction between a reagent trapped in a solid support and diffusible components in an adjacent liquid or gas phase.

BACKGROUND OF THE INVENTION

Hydrophilic polymers play a great role as supports for chromatographic procedures in biotechnology. A variety of methods has been available for the analytical isolations of proteins. Plastic and glass supports are common materials which are widely used for chemical binding of proteins. Sol-gel glass is one of the new supports to direct trapping of different materials (Brinker and Scherer, 1990). This matrix was obtained together with chemical and biochemical reagents using the process of polymerization of the support (Zusman et al., J. Non-Crystal. Solids, 122:107–109, 1990; Materials Letters, 10:1–5, 1990; Analyt. Biochem., 201:103–106, 1992).

The first phase hydrolysis of this process can be described as follows:

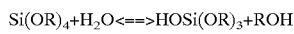

As this process continues Si—OH groups are obtained. The next phase of polymerization is the polycondensation. This latter phase is characterized by elimination of $H_2O$ molecules and alcohol and by transforming SiOH molecules into latticed fibers of $SiO_2$.

Obtaining a small volume of polymerized glass from 1 ml of tetramethoxysilane has taken about 14 days. In spite of that, the obtained sol-gel glass is a porous material. Part of chemical and biochemical compounds remains inside of the gel-glass mass inaccessible for any external reagent. This decreases the amount of trapped materials for performing analytical reactions, especially in biochemical and immunochemical studies. To have access to all the reagent molecules, the prepared glass was crushed into a powder.

All these procedures have very serious defects. As is known, $SiO_2$ is insoluble in the water. Alkaline environment dissolves $SiO_2$ to form silicates according to the reaction

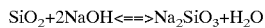

$SiO_2$ in the powder condition passes this reaction very fast, and this makes those columns unstable under effects of alkaline buffers which are necessary for purification of proteins and performing the diagnostic procedures.

In the present invention described herein, all the advantages of the prior art are maintained and a new approach which avoids the disadvantages of the prior art is provided.

SUMMARY

The present invention relates to a gel-fiberglass (GFG) characterized by newly formed sol-gel glass polymerized from oxysilane on the surface of said glass. Said gel-fiberglass can serve as a new support for analytical and chromatographic purposes. This support can be used for different analytical and diagnostic purposes in medicine, pharmaceutical industry, research laboratories, food technology, detection of pollutions in liquid and gas phase, etc. Different chemical and biochemical compounds can be trapped in this material during its preparation. The present invention relates also to the process of the preparation of said fiberglass with or without trapped material in sol-gel glass and to a method for obtaining an interaction between a reagent in a solid support and diffusible components in an adjacent liquid or gas phase.

DETAILED DESCRIPTION OF THE INVENTION

The present invention relates to gel-fiberglass (GFG), to a method of its preparation and to its utilization as a new support in preparative chemistry.

Figure 1A:
FIG. 1A–B is a scanning electron microscope (SEM) photograph of sol-gel glass.
Figure 1B:
Figure 2:
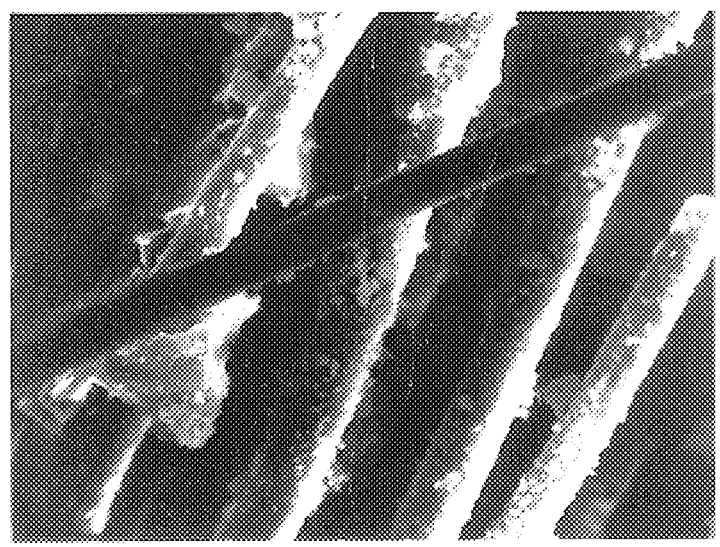
FIG. 2 is an SEM photograph of gel-glass prepared from glass wool.

According to the said method the particles of newly formed high porous gel-glass are presented on the surface of a glass fiber lattice (FIG. 2). This allows external reagents to contact with other reagents trapped in the glass molecules and avoids the necessity to crush the glass into powder. The time for the preparation of glass columns decreases from 14 days to a few hours. The weight of each column is diminished as compared with the weight of a column prepared according to the prior art. The columns are now more stable because $SiO_2$ has a kind of thin film.

The present invention has many applications: for quantitative and/or qualitative analyses in different chemical and biochemical laboratories, for extraction, separation or purification of different components from liquid solutions or from gas phases, for medical diagnostic determination of proteins and other compounds in blood and tissue extracts obtained from animals and patients, for analysis of food production and concentration of pollutants, and for other applications. The invention can be used for diagnosis, prevention and immunotherapy of cancers and other diseases.

Our previous attempts to apply a thin film of gel glass fibers on different materials failed because the application of this thin film on a glass slide did not have sufficient adhesion between them.

The washing of glass wools in an acid solution followed by washing in distilled water not only cleans the glass fibers from dirt and oils but also activates them. As a result, the H+ and OH− groups appear on the surface of the fibers. The activation of the surface of glass fibers provides better adhesion between them and the sol-gel glass which is polymerized from oxysilane on the surface of glass fibers. Thus the surface of the obtained gel-glass with entrapped protein is increased.

The gel-glass columns prepared by this method do not need to be crushed because almost all the molecules of protein entrapped in this high porous gel-glass are located on the surface of glass fibers. This makes the newly produced glass columns highly stable and makes it possible to perform the purification of proteins under high alkaline pH, higher than 9.0, that is very important in the performance of diagnostic procedures.

EXAMPLES

I. The Method of Preparation of a Column

1. Soak 1.5 mg of Pyrex™ glass wool for 5 to 10 min. in acid solution (1% of fluorine acid, HF, and 3% of nitrogen acid, $HNO_3$, in distilled water).

2. Wash the glass wool with distilled water until the pH is neutral.

3. Dry with methanol solution (90%).

4. Mix the glass wool with 0.36 ml of methanol (90%) and 0.3 ml of tetramethoxysilane (TMOS). Shake for 15–20 min.

5. Ten mg of bovine serum albumin (BSA) or human gamma-immunoglobulins (IgG) are dissolved in 0.17 ml of phosphate buffer saline (PBS), pH 7.2. The obtained solution is added to the mixture of glass wool with TMOS and is shaken for 5–10 min. All these procedures are performed on ice.

6. The prepared gel-mass is maintained at room temperature or at 37° C. overnight to complete polymerization, e.g., until the weight of the obtained glass is constant.

7. Derivatization of the prepared glass was performed by adding (2% by weight of glass) by 1% solution of 3-aminopropyltriethoxysilane in water. The glass is kept until completely dried.

II. Three kinds of gel-fiberglass columns were prepared for different immunochemical aims:

1. One column with entrapped anti-human IgG from mammalian serum was prepared to isolate human antigens from human tissue and serum.

2. One column was prepared with entrapped BSA to isolate of anti-BSA immunoglobulins from the rabbit serum.

3. Different IgG were entrapped in columns for affinity isolation of antigens from tissue and sera of ill animals and patients.

III. The second modification in process of preparation of gel fiberglass (GFG) columns 1. Pyrex™ glass fibers (5 mg) were placed in each of 35 small boxes with volume of 3 ml and a surface of 1 $cm^2$ and followed by washing for 5 to 10 min. in an acid solution (1% of fluorine acid, HF, and 3% of nitrogen acid, $HNO_3$, in distilled water). The glass fibers were further washed with distilled water until pH 7.0 and dried with methanol solution (90%).

2. Glass beads were washed (0.7–0.9 mesh) with the same acid solution as mentioned above and then washed in distilled water until pH 7.0. This was derivatized with 2% (w/w) of 3-aminopropyltriethoxysilane in form of 30% solution in methanol.

3. Fiberglass was mixed with 45 µl of TMOS, 0.1 mg of cetyldimethylethylammonium bromide, 50 µl of polyethyleneglycol 6000 in the form of 20% solution in distilled water, 20 µl of 0.1M glycine, and 0.2 mg of polyvinylpyrrolidone (PVP). Shaking 15 min. One mg of protein was dissolved in 10 µl of glycine and is added to each part of fiberglass. All procedures are performed on ice. Shaking is conducted for an additional 15–20 min.

4. The prepared gel-mass is kept at 37° C. for 4–5 h until the weight of the obtained glass was constant, e.g., to pass the complete polymerization.

5. Derivatization of the prepared glass is performed by the addition of 2% (w/w) 3-aminopropyltriethoxysilane in form of 1% solution in distilled water for the final blocking of nonspecific bonds.

6. The GFG is loaded into 10 ml syringe barrels containing a porous nylon membrane. The GFG columns were prepared in a shape of a sandwich from any plates of gel fiberglass (about 1 $cm^2$ each plate) with thin layers of glass beads between them. The resulting GFG columns (about 3 cm height) were washed extensively with distilled water and with phosphate-buffered saline (PBS) to remove residual unreacted protein. The amount of nonentrapped residual protein was determined by routine methods.

IV. 35 mg of rabbit IgG obtained by purification of rabbit serum generated against rat colon cancer were entrapped in GFG columns for affinity isolation of tumorassociated antigens from tumorous tissue. The performed study was shown the possibility to utilize these columns for isolation in a large amount of such antigens. This method can be applied in diagnostic practice.

Characterization of GFG columns

The effects of TMOS, PVP and detergents on characteristics of GFG columns were determined by trapping of bovine serum albumin (BSA) or human gamma-globulin (HgG) in the columns. Effectiveness of columns was evaluated by the determination of the amount and immunochemical characteristics of eluted proteins from anti-BSA or anti-HgG rabbit sera percolated through the columns. These experiments allowed calculation of the amounts of different components needed for the preparation of GFG columns.

Leaching of glass was prevented by adding to the glass mixture of 0.1% (w/w) cetyldimethylethylammonium bromide as a cationic detergent.

Particles of newly formed gel-glass are presented on the surface of a glass fiber lattice (FIG. 2). This permits to the external reagents to come into contact with molecules of a compound trapped in glass.

Figure 3:
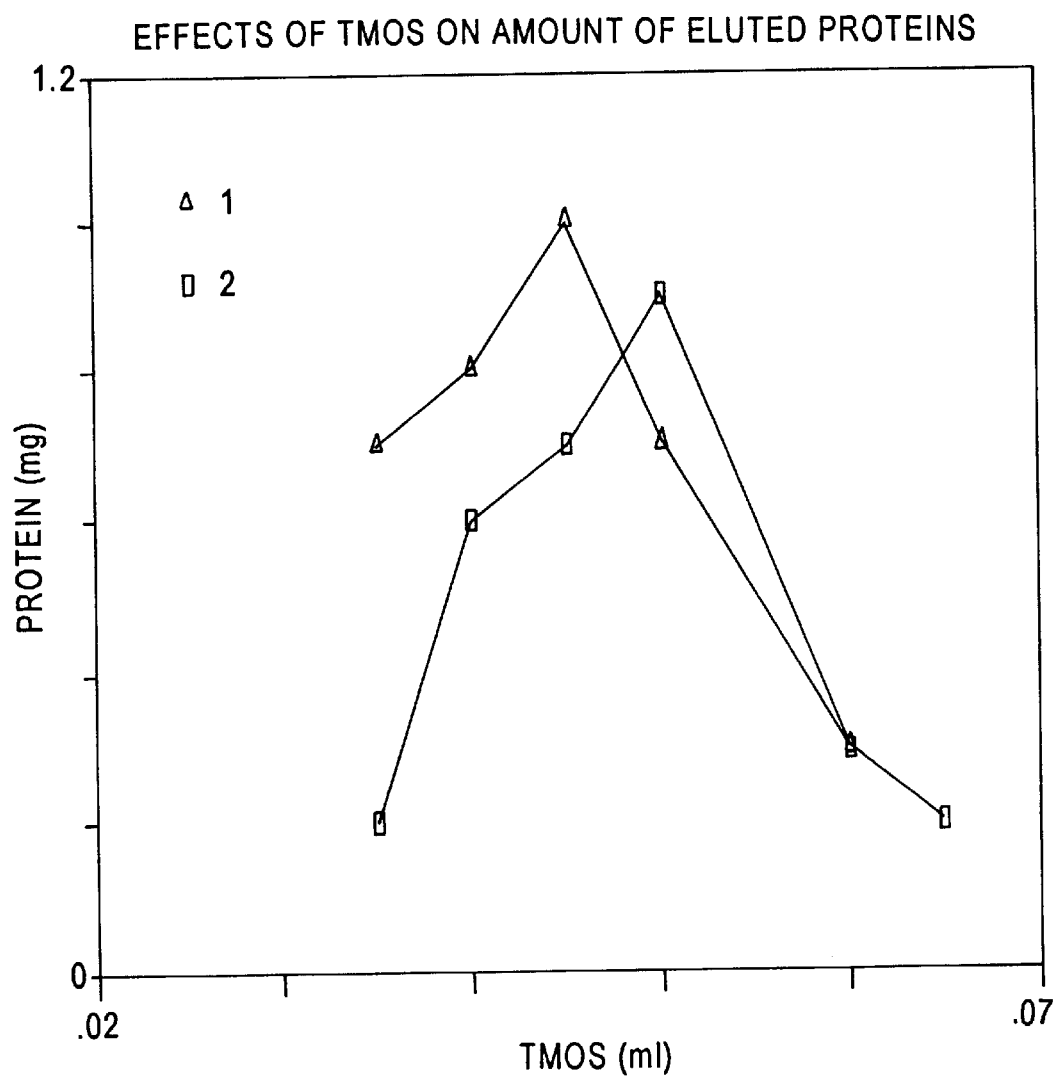
FIG. 3 shows the relationship between the amount of TMOS in GFG columns and the quantity of eluted protein.

The activity of GFG columns was determined by the amount of protein which can be eluted from them. This parameter depends on the amount of TMOS in the matrix: the activity of GFG columns either with entrapped BSA or with HτG was higher when the amount of TMOS was 45 µl/1 mg of protein on a plate (FIG. 3). The nonsignificant differences between both proteins studied can be explained by the different ionic activity between albumins and globulins.

Figure 4:
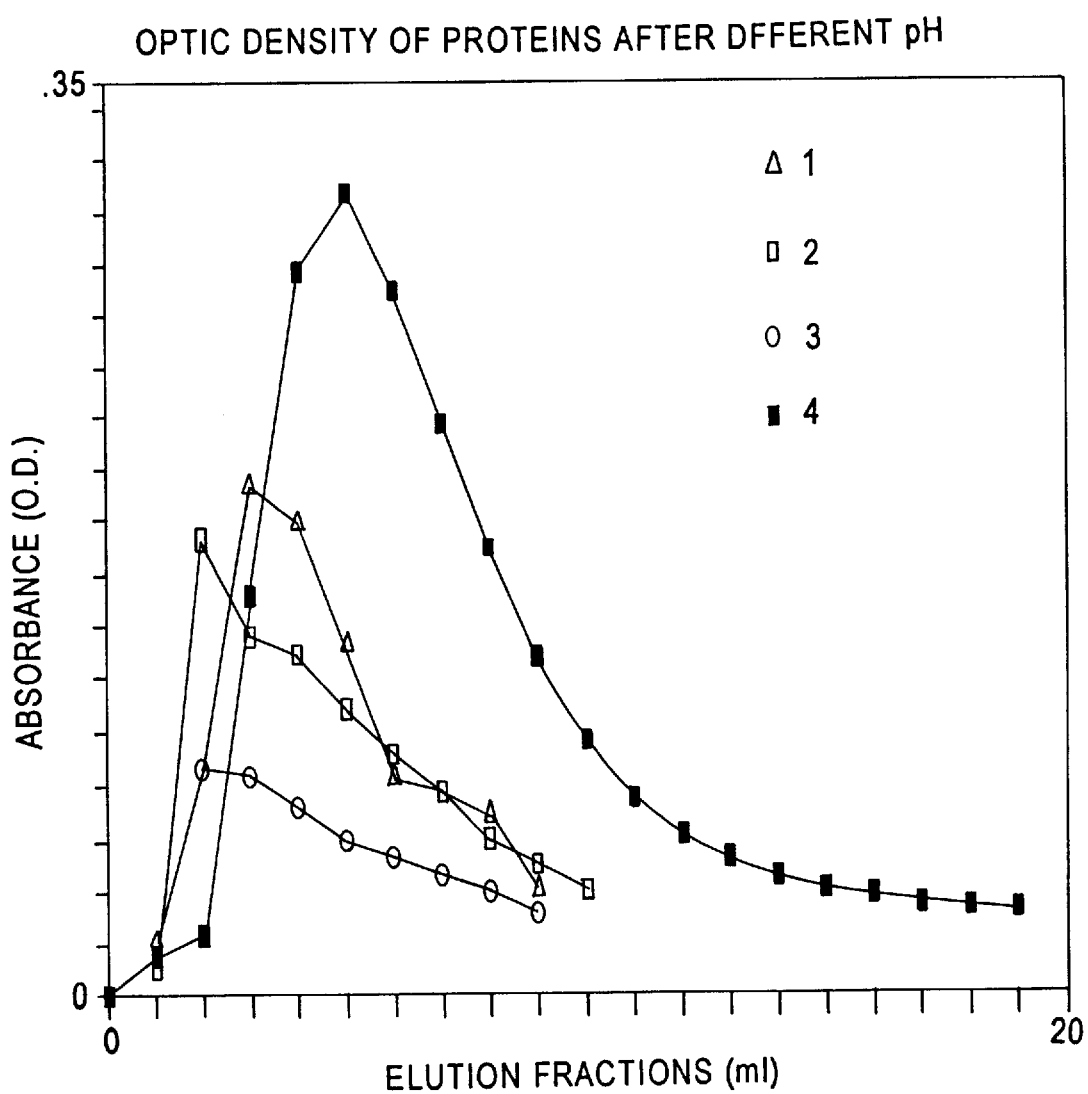
FIG. 4 shows the absorbance curves (O.D.) of rat colon tissue proteins eluted after their percolation through the GFG column with anti-rat colon IgG from rabbit.

The amount of eluted proteins depends also on the type of eluted buffer and its pH. The most effective buffer for elution of rat colon tissue proteins was shown to be 0.1M triethylamine buffer with pH 11.5 (FIG. 4).

Figure 5:
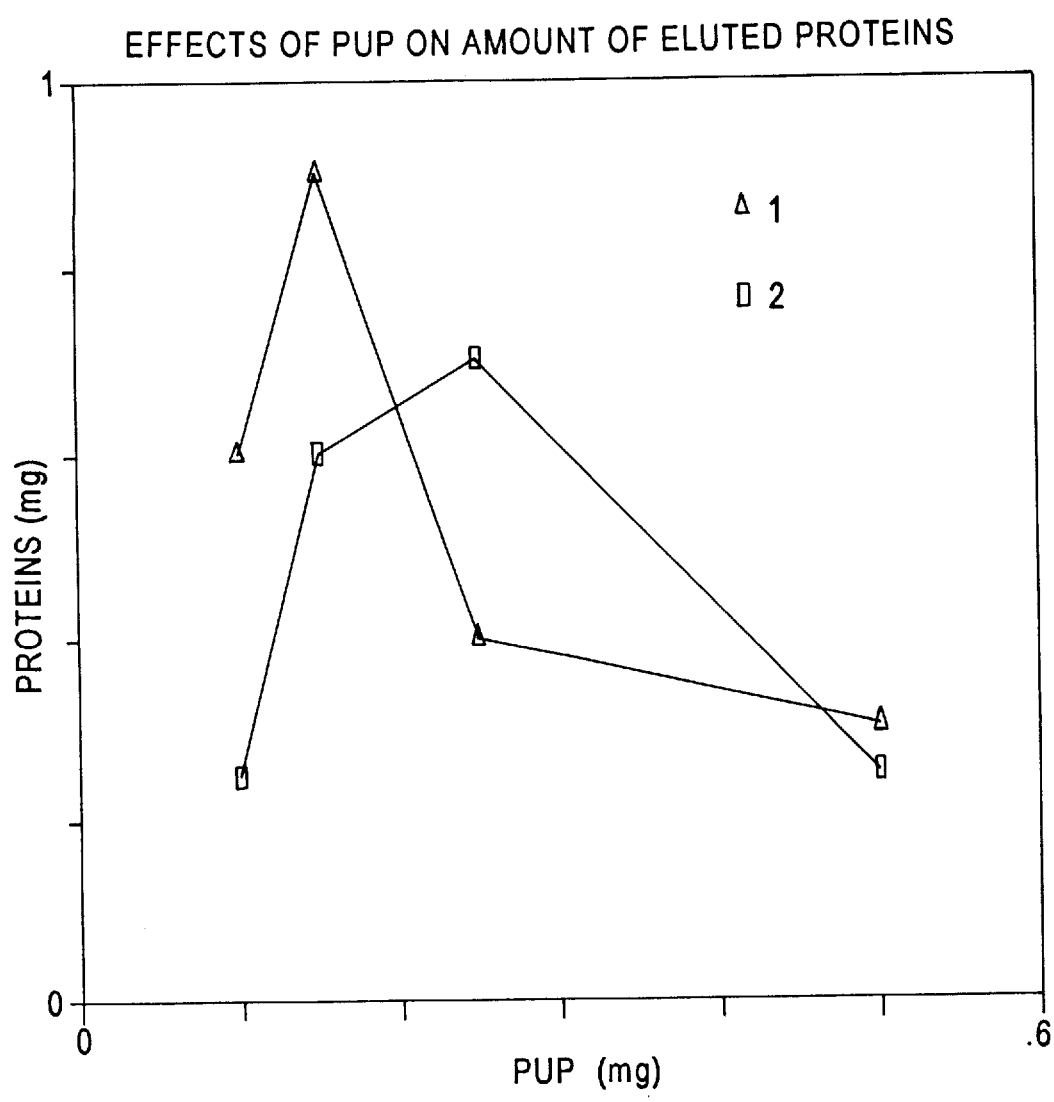
FIG. 5 shows the effect of different concentrations of PVP on the amount of eluted proteins.

Nonspecific protein absorption was eliminated by derivatization of sol-gel glass with a hydrophobic moiety, i.e., by the addition of 3-aminopropyltriethoxysilane and of PVP. As it is shown in FIG. 5, an addition of 0.2 mg PVP/1 mg of protein on a plate is the most effective concentration to eliminate the nonspecific protein absorption and to receive the highest amount of eluted protein. Derivatized sol-gel glass alone, i.e. prepared without protein, did not bind measurable amounts of IgG.

Figure 6:
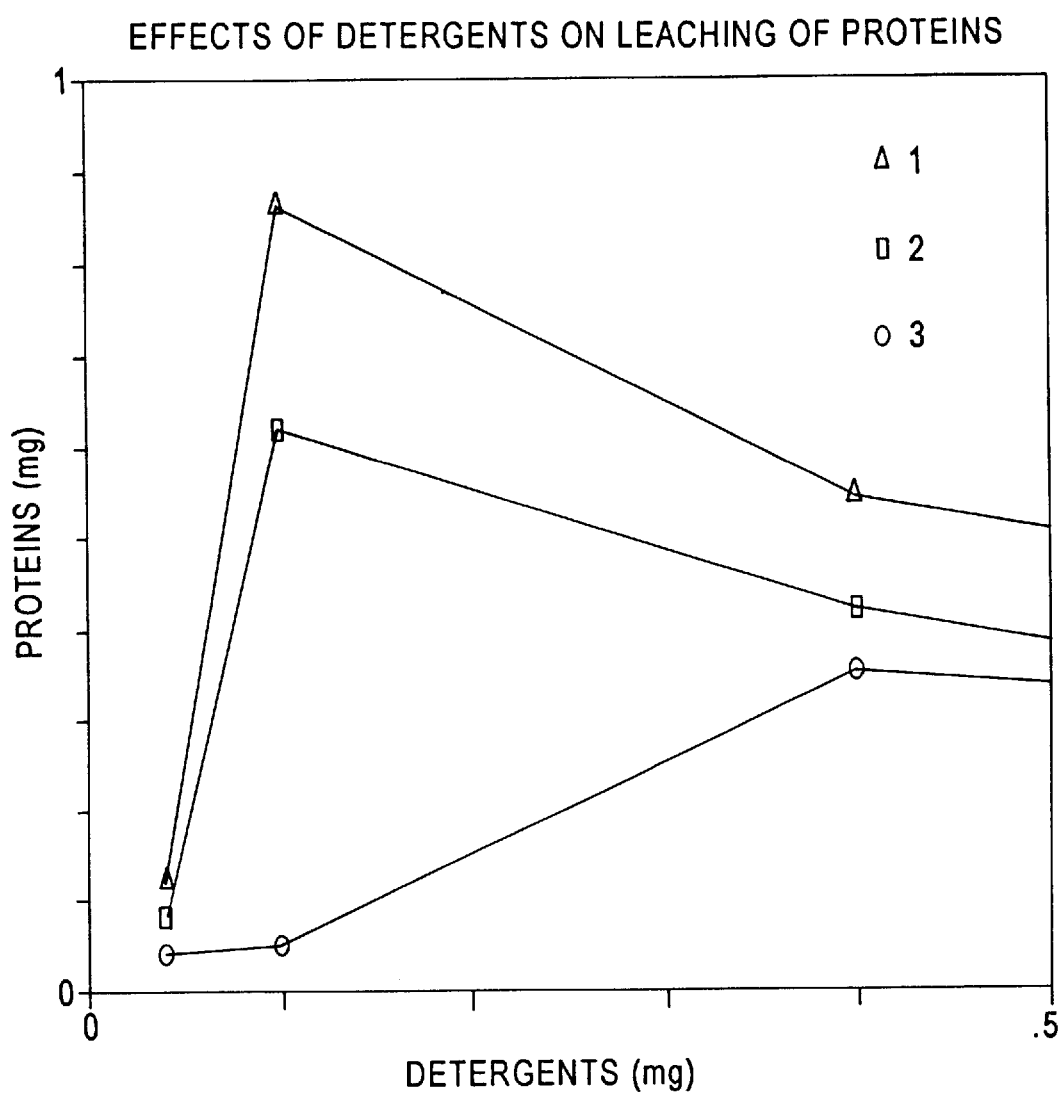
FIG. 6 shows the amount of protein (anti-HgG) which was eluted from GFG columns prepared with different detergents.

As a result of internal tension the leaching of gel-glass developed following its immersion in water. This process was prevented by the addition to a glass solution of cetyldimethylethylammonium bromide as a detergent. Its preventive effect was greater than the other detergents studied (FIG. 6). The quantity of protein leaching from sol-gel glass ranged between 0.5% to 1.0% of its initial amount.

I claim:

1. A gel-fiberglass structure comprising a polymerized oxysilane in the form of sol-gel glass on the surface of a substrate which is selected from the group consisting of activated glass wool fibers and activated fibrous glass, wherein the oxysilane is polymerized after application to said substrate.

2. The gel-fiberglass structure according to claim 1, wherein said structure is a support for analytical and chromatographic purposes.

3. The gel-fiberglass structure according to claim 1, further comprising chemical or biochemical reagents trapped in said sol-gel glass, wherein said sol-gel glass is in the form of a column.

4. The gel-fiberglass structure according to claim 2, for chemical or biochemical quantitative or qualitative analyses, for extraction and for separation or purification of different compounds from liquid solutions or from gas phases.

5. The gel-fiberglass structure according to claim 2, for medical and veterinary diagnostic determinations of proteins and other compounds in blood and tissue extracts.

6. The gel-fiberglass structure according to claim 2, for the analysis of food production and concentration of pollutants.

7. The gel-fiberglass structure according to claim 3 wherein the trapped reagents are different anti-human IgG from mammalian serum for affinity isolation of human antigens from tissue extracts and from sera of ill animals or patients.

8. A method for the preparation of a gel-fiberglass structure comprising a polymerized oxysilane on the surface of a substrate which is selected from the group consisting of activated glass wool fibers and activated fibrous glass, comprising:

coating said activated glass substrate with oxysilane and polymerizing.

9. A method for the preparation of gel-fiberglass according to claim 8 wherein chemical or biochemical reagents are trapped in the sol-gel glass during its preparation.

10. The method according to claim 9, further comprising:

(a) activating said glass wool by washing it in an acid solution followed by washing it in distilled water to remove residual unreacted reagents, and (b) adhering the glass wool to sol-gel glass by polymerizing oxysilane, which is a precursor of said sol-gel glass, in the presence of a reagent on the surface of the glass wool fibers, said reagent being chemically or biologically active and entrapped in said sol-gel glass.

11. The method according to claim 10, wherein said entrapped reagents are mammalian IgG for the purification of human antigens from human tissue and serum.

12. The method according to claim 10, wherein said entrapped reagent is BSA for the isolation of anti-BSA IgG from mammalian serum.

13. A method for diagnostic purposes comprising:

interacting a gel-fiberglass structure having a reagent entrapped therein with at least one diffusible component in an adjacent liquid or gas phase, wherein said gel-fiberglass structure comprises a polymerized oxysilane in the form of sol-gel glass on the surface of a substrate which is selected from the group consisting of glass wool fibers and fibrous glass, wherein the oxysilane is polymerized after application to said substrate, said sol-gel glass comprising chemical or biochemical reagents entrapped therein.

* * * * *